United States Patent Office 3,507,761
Patented Apr. 21, 1970

3,507,761
NOVEL PHOTOCHEMICAL REACTIONS OF 2-CARENE COMPOUNDS AND NOVEL BICYCLIC PRODUCTS RESULTING THEREFROM
Paul J. Kropp, Springfield Township, Hamilton County, Ohio, assignor to The Procter & Gamble Company, Cincinnati, Ohio, a corporation of Ohio
No Drawing. Filed June 30, 1966, Ser. No. 561,721
Int. Cl. B01j 1/10; C07c 3/24; C11d 3/50
U.S. Cl. 204—162
10 Claims

ABSTRACT OF THE DISCLOSURE

Photochemical process for the preparation of 1,8-menthadienes and/or 1,4,4-trimethylbicyclo[3.2.0]hept-2-enes, novel compounds, comprising the irradiation of 2-carenes with ultraviolet light is disclosed. The products of the process have desirable odor characteristics and are useful in perfume compositions.

---

This invention relates to novel photochemical reactions of 2-carene compounds and to the products of these reactions. More specifically, it has been discovered that certain 2-carene compounds, on irradiation with ultraviolet light, rearrange to form a 1,8-methandiene compound and/or a novel 1,4,4 - trimethylbicyclo[3.2.0]hept-2-ene compound. It has further been discovered that the presence or absence of a photosensitizer during said irradiation affects the relative proportions of the 1,8-menthadiene to the 1,4,4-trimethylbicyclo[3.2.0]hept-2-ene. The 1,8-menthadiene and the 1,4,4 - trimethylbicyclo[3.2.0] hept-2-ene products have desirable odor characteristics and thus have utility in the perfume arts, particularly as components of perfume compositions.

Accordingly, an object of this invention is to provide novel photochemical reactions of 2-carene compounds.

It is a more specific object of this invention to provide novel photosensitized reactions of 2-carene compounds.

It is another object of this invention to provide novel nonphotosensitized reactions of 2-carene compounds.

It is a further object of this invention to provide novel odoriferous 1,4,4 - trimethlylbicyclo[3.2.0]hept-2-ene compounds.

The above and other objects are achieved by a novel photochemical process, which comprises: subjecting a 2-carene compound of the general Formula I (I)

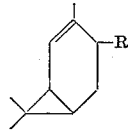

to ultraviolet irradiation to form a compound selected from the group consisting of a 1,8-menthadiene of the general Formula II, (II)

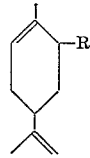

a 1,4,4 - trimethylbicyclo[3.2.0]hept-2-ene of the general Formula III, (III)

and mixtures thereof, wherein R is the same in each of the above general Formulas I, II and III and is selected from the group consisting of hydrogen, hydroxyl, acyl of from 2 to 5 carbon atoms, alkylol of from 1 to 5 carbon atoms, and alkyl of from 1 to 5 carbon atoms.

It is to be noted that the term "ultraviolet irradiation" is used generically herein and in the appended claims to define both (A) irradiation in the presence of a photosensitizer ("photosensitized") and (B) irradiation in the absence of a photosensitizer ("nonphotosensitized").

Examples of specific 2-carenes of Formula I and the corresponding Formula II and Formula III products are shown in Figure 1 below.

It is surprising that the 2-carenes of Formula I undergo the type of photochemical reaction described above, especially since the present invention is believed to represent the first ultraviolet irradiation of a carene derivative. A particularly unexpected feature of this reaction is the fact that the presence or absence of a photosensitizer directly influences the type of product, or the relative proportion of products, formed during the irradiation.

More specifically, nonphotosensitized irradiation generally results in a weight ratio of Formula II product to Formulate III product ranging from about 1:1 to about 3:1. On the other hand, photosensitized irradiation results in the formation of the Formula III product with substantially complete exclusion of Formula II product, e.g., a weight ratio of Formula III product to Formula II product greater than about 100:1.

A partially photosensitized irradiation can also be used to advantage herein. In this instance, the proportion of Formula II and Formula III products is correspondingly between the above-stated ranges.

The 2-carene (Formula I) starting material in the photochemical process of the present invention is a derivative of the well known and naturally occurring compound (+)-3-carene and can be prepared from (+)-3-carene by conventional techniques.

More specifically, 2-carene can be prepared from (+)-3-carene by treatment with N-lithium ethylenediamine according to the method disclosed by G. Ohloff et al. in Helv. Chim. Acta., 48, 1665 (1965).

2-caren-4-ol can be prepared from (+)-3-carene by photosensitive oxidation according to the method disclosed by K. Gollnick et al. in Ann. 687, 14 (1965).

4-acyl-2-carenes can be prepared from (+)-3-carene by treatment with acyl halides in the presence of Lewis acids according to the method described by Alder et al. in German Patent 39,693 (1965).

2-carene-4-methanol can be prepared from (+)-3-carene by treatment with paraformaldehyde in acetic acid followed by saponification of the resulting acetate derivative as disclosed by G. Ohloff et al. in Ann., 613, 43 (1958). Other 2-caren-4-alkylols, i.e., higher homologs of 2-carene-4-methanol, can be prepared from the corresponding 4-acyl-2-carenes by hydrogenation as disclosed by Alder et al. in the above-mentioned German Patent 39,693.

4-alkyl-2-carenes can be prepared from the corresponding alkylols by conversion to their p-toluene sulfonate derivatives followed by reduction with lithium aluminum hydride.

As stated previously, the 2-carene compounds of Formula I, when subjected to ultraviolet irradiation, rearrange to form Formula II and Formula III products and the relative amounts of Formula II and Formula III products are dependent upon whether the irradiation is photosensitized or nonphotosensitized. These specific embodiments of the invention are discussed in detail hereinafter.

FIGURE 1

| | Starting Material | | Product |
|---|---|---|---|
| R | 2-carene of Formula I | 1,8-menthadiene of Formula II | 1,4,4-trimethylbicyclo[3.2.0]hept-2-ene of Formula III |

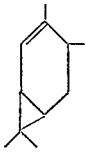

| | | | |
|---|---|---|---|
| Hydrogen | 2-carene | 1,8-menthadiene | 1,4,4-trimethylbivyclo[3.2.0]-hept-2-ene. |
| Hydroxyl | 2-caren-4-ol | 1,8-menthadien-6-ol | 1,4,4-trimethylbicyclo[3.2.0]-hept-2-en-7-ol. |
| Acyl | 4-acyl-2-carene | 6-acyl-1,8-menthadiene | 7-acyl-1,4,4-trimethylbicyclo-[3.2.0]hept-2-ene. |
| —$\overset{O}{\underset{\|}{C}}$—CH₃ | 4-acetyl-2-carene | 6-acetyl-1,8-menthadiene | 7-acetyl-1,4,4-trimethylbicyclo-[3.2.0]hept-2-ene. |
| —$\overset{O}{\underset{\|}{C}}$—CH₂CH₃ | 4-propionyl-2-carene | 6-propionyl-1,8-menthadiene | 7-propionyl-1,4,4-trimethylbicyclo-[3.2.0]hept-2-ene. |
| —$\overset{O}{\underset{\|}{C}}$—(CH₂)₂CH₃ | 4-butyryl-2-carene | 6-butyryl-1,8-menthadiene | 7-butyryl-1,4,4-trimethylbicyclo-[3.2.0]hept-2-ene. |
| —$\overset{O}{\underset{\|}{C}}$—(CH₂)₃CH₃ | 4-valeryl-2-carene | 6-valeryl-1,8-menthadiene | 7-valeryl-1,4,4-trimethylbicyclo-[3.2.0]hept-2-ene. |
| Alkylol | 2-caren-4-alkylol | 1,8-menthadien-6-alkylol | 1,4,4-trimethylbicyclo[3.2.0]-hept-2-en-7-alkylol. |
| —CH₂OH | 2-carene-4-methanol | 1,8-menthadiene-6-methanol | 1,4,4-trimethylbicyclo[3.2.0]hept-2-ene-7-methanol. |
| —CHCH₃<br>  \|<br>  OH | 2-caren-4-(1-ethanol) | 1,8-menthadien-6-(1-ethanol) | 1,4,4-trimethylbicyclo[3.2.0]hept-2-en-7-(1-ethanol). |
| CH(CH₂)CH₃<br>\|<br>OH | 2-carene-4-(1-n-propanol) | 1,8-menthadiene-6-(1-n-propanol) | 1,4,4-trimethylbicyclo[3.2.0]hept-2-ene-7-(1-n-propanol). |
| CH(CH₂)₂CH₃<br>\|<br>OH | 2-carene-4-(1-n-butanol) | 1,8-menthadiene-6-(1-n-butanol) | 1,4,4-trimethylbicyclo[3.2.0]hept-2-ene-7-(1-n-butanol). |
| CH(CH₂)₃CH₃<br>\|<br>OH | 2-carene-4-(1-n-pentanol) | 1,8-menthadiene-6-(1-n-pentanol) | 1,4,4-trimethylbicyclo[3.2.0]hept-2-ene-7-(1-n-pentanol). |
| Alkyl | 4-alkyl-2-carene | 6-alkyl-1,8-menthadiene | 7-alkyl-1,4,4-trimethylbicyclo[3.2.0]hept-2-ene. |
| —CH₃ | 4-methyl-2-carene | 6-methyl-1,8-menthadiene | 7-methyl-1,4,4-trimethylbicyclo[3.2.0]hept-2-ene. |
| —CH₂CH₃ | 4-ethyl-2-carene | 6-ethyl-1,8-menthadiene | 7-ethyl-1,4,4-trimethylbicyclo[3.2.0]hept-2-ene. |
| —(CH₂)₂CH₃ | 4-n-propyl-2-carene | 6-n-propyl-1,8-menthadiene | 7-n-propyl-1,4,4-trimethylbicyclo[3.2.0]hept-2-ene. |
| —(CH₂)₃CH₃ | 4-n-butyl-2-carene | 6-n-butyl-1,8-menthadiene | 7-n-butyl-1,4,4-trimethylbicyclo[3.2.0]hept-2-ene. |
| —(CH₂)₄CH₃ | 4-n-pentyl-2-carene | 6-n-pentyl-1,8-menthadiene | 7-n-pentyl-1,4,4-trimethylbicyclo[3.2.0]hept-2-ene. |

THE NONPHOTOSENSITIZED IRRADIATION

In carrying out the nonphotosensitized rearrangement of the 2-carene starting material to form Formula II and Formula III products, any convenient source of ultraviolet radiation can be used, i.e., a light source that emits photoenergy at wavelengths distributed throughout the range of from about 200 mμ to about 400 mμ. The wavelength of irradiation is preferably concentrated within the maximum absorption spectrum of the starting material, i.e., at wavelengths distributed throughout the range of from about 200 mμ to about 260 mμ. Irradition substantially exclusively within a certain narrow wavelength range, e.g., within the 250 mμ–255 mμ range as compared to wavelengths distributed throughout the 200 mμ–260 mμ range, can lead to different results as discussed hereinafter.

Commercially available high-pressure mercury arc lamps, i.e., lamps having a total power capacity ranging from about 100 watts to about 10,000 watts, preferably from about 200 watts to about 600 watts, have the above-described spectral characteristics and are particularly useful sources of ultraviolet radiation for use herein.

It is preferable, although not essential, to use a Vycor or quartz reaction vessel for the irradiation. Ordinary laboratory glassware, e.g., Pyrex, tends to filter transmission of wavelengths within the above-stated preferred range.

Preferably, a solvent is used as a medium for the irradiation reaction. Desirable solvents are those which dissolve the starting material and products to form a homogeneous system but are otherwise inert and do not substantially interfere with the transmission of the radiation.

Saturated hydrocarbons constitute a class of preferred solvents. Examples of such saturated hydrocarbon solvents include the alkanes, preferably of from 5 to 12 carbon atoms, such as N-hexane, octane, dodecane and the like; and the cyclic alkanes, preferably of from about 5 to 10 carbon atoms such as cyclopentane, cyclohexane, cyclooctane and the like. Hexane or cyclohexane represent especially preferred saturated hydrocarbon solvents.

Ethers constitute another class of solvents for preferred use with the nonphotosensitized irradiation. Examples of suitable ether solvents include cyclic monoxy ethers, such as tetrahydrofuran, cyclic dioxy ethers such as dioxane, aliphatic monoxy ethers such as diethyl ether and aliphatic dioxy ethers such as ethylene glycol dimethyl ether or diethylene glycol dimethyl ether, all of said ether solvents preferably containing from about 4 to about 10 carbon atoms.

Alcohols constitute a class of highly preferred solvents that can advantageously be used with the nonphotosensitized irradiation. Examples of suitable alcohol solvents include aliphatic monohydric alcohols of from about 1 to about 10 carbon atoms such as methanol, ethanol, t-butyl alcohol, and the like, aliphatic dihydric alcohols from about 2 to about 10 carbon atoms, such as ethylene glycol or propylene glycol. Methanol or t-butyl alcohol represent especially preferred alcohol solvents.

Preferably, the concentration of the Formula I starting material in the reaction medium ranges from about 0.001 M to about 2 M, more preferably from about 0.01 M to about 0.5 M.

The nonphotosensitized irradiation is primarily photochemical rather than thermodynamic in nature; thus the temperature employed can vary widely, e.g., from about −40° C. to about 100° C. A preferred temperature range for the reaction is from about 20° C. to about 35° C.

The time for the irradiation to reach completion is generally between about 5 minutes and 60 hours, usually between about 1 hour and about 16 hours. The reaction time varies with the concentration of the starting material in the solvent, the intensity of the radiation source, the identity of the reaction medium (solvent), the physical reaction conditions and the absorption of the irradiation by the reaction vessel. However, the course of the reaction can readily be followed by conventional techniques, e.g., by observing the optical rotation of the system, or by gas chromatography. It is highly preferable to stop the reaction when the maximum yield of product is obtained since further irradiation subsequent to this time can result in the formation of undesirable polymerization products.

It is preferable to carry out the irradiation in an inert atmosphere such as nitrogen, argon, etc., to prevent oxidation, contamination and the like. To insure the uniform irradiation of the starting material, it is also preferable to bubble the inert gas through the reaction medium during the irradiation.

The Formula II and Formula III products (it is to be noted that the ratio of Formula II to Formula III products resulting from the nonphotosensitized irradiation ranges from about 1:1 to about 3:1) are preferably separated from the reaction mixture and then, optionally, separated from each other. This can be readily accomplished by conventional techniques, e.g., by extraction, distillation, elution chromatography or gas-liquid chromatography. A specific method of separating and purifying these products is found hereinafter in Example I.

THE PHOTOSENSITIZED IRRADIATION

In carrying out the photosensitized rearrangement of the 2-carene starting material to predominantly form a Formula III product, any convenient source of ultraviolet radiation can also be used, i.e., a light source that emits photoenergy at wavelengths distributed throughout the range from about 200 m$\mu$ to about 400 m$\mu$. The wavelength of irradiation is preferably concentrated within the maximum absorption spectrum of the photosensitizer, i.e., at wavelengths distributed throughout the range of from about 200 m$\mu$ to about 360 m$\mu$. High-pressure mercury arc lamps, as defined hereinbefore, are quite satisfactory sources of radiation. As will be apparent to those skilled in the art, ordinary glassware is quite satisfactory as a reaction vessel for the photosensitized irradiation when photosensitizers absorbing above about 280 m$\mu$ are employed.

The photosensitized irradiation of this invention is characterized by the presence of a photosensitizer. Preferably, the photosensitizer should be photochemically stable and have a triplet energy greater than about 75 kcal./mole. Aromatic hydrocarbons constitute a class of preferred photosensitizers. More specifically, aromatic hydrocarbons, preferably from about 6 to about 18 carbon atoms, such as benzene, toluene and xylene are very desirable photosensitizers for use in the instant photosensitized irradiation.

Another class of photosensitizers for preferred use in the present photosensitized irradiation is aromatic amines, preferably of from about 6 to about 10 carbon atoms, such as aniline and toluidine.

Another class of photosensitizers that can be advantageously used in the present photosensitized irradiation is aryl ketones, preferably of from about 8 to about 13 carbon atoms, such as acetophenone and xanthone.

Still another class of photosensitizers that can be used in the present irradiation is aliphatic ketones, preferably of from about 3 to about 12 carbon atoms, such as acetone and 2-pentanone.

It is very convenient to dissolve the starting material in the photosensitizer. In general, each of the above-disclosed photosensitizers is capable of dissolving the starting material to form a homogeneous system and thus serve a dual role of photosensitizer/solvent.

Optionally, any of the solvents specified for the nonphotosensitized irradiation can be used in conjunction with the photosensitizer. For the irradiation to be characterized as "photosensitized" (to give the maximum ratio of Formula III product to Formula II product), the weight per unit volume concentration of the photosensitizer in the solvent must be greater than about 0.5%, preferably greater than about 10%, depending upon the identity of the photosensitizer and the magnitude of its absorption of ultraviolet light under the particular conditions of solvent, vessel and light source selected.

Use of a solvent and a more dilute concentration of photosensitizer than that specified immediately above is characterized herein as a "partially photosensitized" irradiation. In the event of a partially photosensitized irradiation, the ratio of Formula III to Formula II product is correspondingly adjusted depending on the concentration of the photosensitizer.

The other conditions for the photosensitized irradiation, i.e., concentration of starting material, temperature, time, oxygen-free atmosphere, separation of products, and the like, are essentially the same as those specified hereinbefore for the nonphotosensitized irradiation.

Attention is now directed to two embodiments of this invention wherein the 2-carene starting material can rearrange to predominately form the Formula III product, even in the absence of external photosensitization.

First, it has been discovered that the above-described result is achieved by irradiating any of the 2-carene starting materials with wavelengths substantially exclusively within the range of from about 250 m$\mu$ to about 255 m$\mu$. Commercially available low-pressure mercury lamps, i.e., lamps having a total power capacity ranging from about 0.5 watt to about 50 watts, preferably from about 1 watt to about 25 watts, emit wavelengths having these spectral characteristics and can be conveniently used in effecting this embodiment of the invention. The other conditions for this particular embodiment are essentially the same as those specified hereinbefore for the nonphotosensitized irradiation with the exception that a longer time is generally required for the irradiation, e.g., 20 hours to 80 hours, usually 30 hours to 50 hours.

Second, it has been discovered that the above-described result is achieved by irradiating the 4-acyl-2-carene starting materials with wavelengths distributed throughout the range of from about 280 m$\mu$ to about 400 m$\mu$, preferably from about 300 m$\mu$ to about 350 m$\mu$. A high pressure mercury lamp, e.g., as defined hereinbefore, in conjunction with a Corex or a Pyrex filter can be conveniently used in effecting this embodiment of the invention. The other conditions for this embodiment of the invention are essentially the same as those specified hereinbefore for the photosensitized irradiation. It is to be noted that certain of the specified photosensitizers, e.g., benzene, do not absorb ultraviolet light above about 280 m$\mu$ and thus function as inert solvents rather than as photosensitizers under the specific irradiation conditions of this embodiment of the invention.

A clear explanation of the theory underlying the two above-described special embodiments of this invention cannot be readily advanced. However, in the first case it is believed that irradiation within the specified range selectively effects a low-energy transition which in turn causes rearrangement of the starting material to predominately form the Formula III product. In the second case, it is believed that the acyl portion of the molecule photosensitizes the cyclic portion of the molecule at wavelengths within the specified range.

The compounds prepared by the novel photochemical reaction of this invention all have highly desirable and useful odors. The 1,8-menthadiene compounds of Formula II have an odor generally characterized as minty-camphoraceous. The novel 1,4,4-trimethylbicyclo[3.2.0]- hept-2-ene compounds of Formula III have a particularly desirable odor that is generally characterized as sweet-woody with a green leafy side note.

The above compounds can be used individually or in admixture with each other as odorants per se or as components of perfume compositions for ultimate use in products such as soaps, detergents, deodorants, and the like. Perfume compositions containing odoriferously effective amounts, e.g., 0.0001% to about 50%, of any of the above-described compounds are desirable and useful. More specific illustrations of the perfume utility of these compounds are found in Examples V to VII hereinafter.

Examples

The following examples illustrate specific preferred embodiments of this invention and are not intended to be limiting. All percentages and ratios in the following examples, as well as in this specification and in the appended claims, are by weight unless otherwise indicated.

Data listed in all of the examples were obtained by means of the following techniques unless otherwise indicated. Optical rotations were measured in absolute ethanol, and infrared spectra were obtained on neat samples with a Perkin-Elmer Infracord spectrophotometer. Melting points were determined on a micro hotstage and are calibrated, corrected and expressed in degrees centigrade, as are all other temperatures. Gas chromatographic analyses were perforced on an Aerograph model A–90P instrument using 10-ft. x 0.25-in. columns packed with (A) 20% Carbowax 20M (a conventional polyester column packing) on 60/80-mesh firebrick or 20% SE–30 (a conventional silicone column packing) on 60/80-mesh Chromosorb W. The elution order used in column chromatography was hexane, benzene, ether and ethyl acetate. Nuclear magnetic resonance (n.m.r.) spectra were determined in deuteriated chloroform solution with a Varian model A–60 or HA–100 spectrometer, using tetramethylsilane as an internal standard. The n.m.r. data are noted by multiplicity (s.=singlet, d.=doublet, t.=triplet, q.=quartet and m.=unresolved multiplet), integration, coupling constant (in c.p.s.), and assignment. Mass spectra were obtained using an Atlas CH–4 spectrometer. Microanalyses were performed.

All irradiations, unless otherwise indicated, were performed in a conventional photochemical reaction flask equipped with a nitrogen flush and a Vycor immersion well. Nitrogen was bubbled through the reaction mixtures and the temperature was maintained in the range of 20°–35° C. by means of a water jacket.

The light sources used in the following examples were commercially available mercury lamps. More specific data on the lamps used are tabulated as follows:

| Ultraviolet Spectral Characteristics (watts) | Radiation Source | |
|---|---|---|
| | Hanovia L–679A [1] (high pressure) | Rayonet RPR–2537A [2] (low pressure) |
| | Total Power Capacity (watts) | |
| | 450 | ~20 |
| 200 mµ–280 mµ | 27.0 | [2] |
| 280 mµ–320 mµ | 28.7 | [3] |
| 320 mµ–400 mµ | 28.0 | |
| Total radiated energy | 175.8 | ~1.9 |

[1] Obtained from Hanovia Lamp Division, Englehard Industries. For further details see specification sheet EH–223, 5-1-59, Englehard Industries.
[2] Obtained from Southern New England Ultraviolet Company. For further details see Catalog No. RPR–100, page 3, Southern New England Ultraviolet Company.
[3] ~1.5 at 253.7 mµ.

Example I

Nonphotosensitized irradiation of (+)-2-carene-4-methanol.—A solution containing 433 mg. of (+)-2-carene-4-methanol in 150 ml of methanol (0.017 M) was irradiated for 7 hours with a Hanovia L–679A 450-watt high-pressure mercury arc lamp in the apparatus previously described. Removal of the methanol at atmospheric pressure followed by short-path distillation of the resulting residue at 140°–150° C. (0.2 mm.) gave 324 mg. (75% recovery) of a colorless liquid which was shown by gas chromatography to consist of several components including recovered starting material (5%), 1,8-menthadiene-6-methanol (35%) and 1,4,4-trimethylbicyclo-[3.2.0]hept-2-ene-7-methanol (13%).

Gas chromatographic isolation of the major component followed by short-path distillation at 85° (0.25 mm.) gave (+)-1,8-p-menthadiene-6-methanol as a colorless liquid having a minty-camphoraceous odor, $[\alpha]_D^{27}+85°$ (c. 1.76); $\lambda_{max}$ 2.95, 6.06, and 11.26µ; n.m.r. spectrum: $\tau$ 4.54 (m., 1, CH—2), 5.38 (s., 2, CH$_2$—9), 6.42 (m., 2, —CH$_2$O—), and 8.32 (s., 6, CH$_3$—7 and —10); m/e: 166, 160, 151, 148, 135 and 133; the 3,5-dinitrobenzoate of this compound was formed as long colorless needles from ethanol, M.P. 78.5–79.5°, $[\alpha]_D^{27}+54°$ (c. 1.40).

Analysis.—Calculated for $C_{11}H_{18}O$ (percent): C, 79.46; H, 10.92. Found (percent): C, 79.2; H, 10.8.

Isolation of the 1,4,4-trimethylbicyclo[3.2.0]hept-2-ene-7-methanol by preparative gas chromatography followed by short-path distillation at 90° (0.8 mm.) gave stereoisomers identical in all respects to those obtained in Example II, infra.

In this example, when the (+)-2-carene-4-methanol starting material is replaced with the Formula I starting materials of Figure 1, supra, compounds corresponding to the Formula II and Formula III products of Figure I are formed.

Also in this example, substantially equivalent results are obtained in that 1,8-menthadiene-6-methanol and 1,4,4-trimethylbicyclo[3.2.0]hept-2-ene-7 - methanol are formed when the methanol solvent is replaced by a solvent selected from the group consisting of aliphatic monohydric alcohols of from about 1 to about 10 carbon atoms, e.g., ethanol or t-butyl alcohol; aliphatic dihydric alcohols of from about 2 to about 10 carbon atoms, e.g., ethylene glycol or propylene glycol; ethers of from about 4 to about 10 carbon atoms, e.g., tetrahydrofuran, dioxane, diethyl ether or ethylene glycol dimethyl ether; saturated hydrocarbons such as alkanes of from about 5 to about 12 carbon atoms, e.g., n-hexane and dodecane, or cyclic alkanes of from about 5 to about 10 carbon atoms, e.g., cyclohexane.

Example II

Photosensitized irradiation of (+)-2-carene - 4 - methanol.—A solution containing 628 mg. of (+)-2-carene-4-methanol in 130 ml. of benzene (0.029 M) was irradiated for 14 hours with a Hanovia L–679A 450-watt high-pressure mercury lamp in the apparatus previously described. Removal of the benzene at atmospheric pressure followed by short-path distillation of the resulting residue at 105–110° (0.2 mm.) gave 428 mg. (79% recovery) of a colorless liquid which was shown by gas chromatography to consist solely of 1,4,4 - trimethylbicyclo-[3.2.0]hept-2-ene-7-methanol (83+%), and recovered starting material (17%). (+)-1,8-menthadiene-6-methanol was not detectable.

Further isolation by gas chromatography indicated that this alcohol was present in the form of two stereoisomers: Isolation by gas chromatography followed by short-path distillation at 104–105° (6.5 mm.) gave (+)-1,4,4-trimethyl-cis-bicyclo[3.2.0]hept-2 - ene - 7 - endo-methanol as a colorless liquid having a sweet woody odor with a green leafy side note, e.g., a cedarwood odor $[\alpha]_D^{27}+89°$ (c. 1.53); $\lambda_{max}$ 2.98 and 12.88µ; $\lambda_{max}$ (0.02 M CCl$_4$) 3636 and 3620 cm.$^{-1}$; n.m.r. spectrum: $\tau$ 4.60 (q., 2, J 5.0, CH—2 and —3), 6.52 (m., 2, —CH$_2$O—), 8.76 (s., 3, CH$_3$—), and 9.04 (s., 6, 2CH$_3$—); m/e: 166, 151, 148, 135, 119; and the 3,5-dinitrobenzoate of this compound was formed as long colorless needles from hexane, M.P. 76–77°.

Analysis.—Calculated for $C_{11}H_{18}O$ (percent): C, 79.46; H, 10.92. Found (percent): C, 79.25; H, 10.65.

*Analysis.*—Calculated for $C_{18}H_{20}N_2O_6$ (percent): C, 59.99; H, 5.59; N, 7.77. Found (percent): C, 60.0; H, 5.6; N, 7.8.

Similar isolation by gas chromatography followed by short-path distillation at 90–90.5° (0.8 mm.) gave (−)-1,4,4-trimethyl-cis-bicyclo[3.2.0]hept - 2 - ene - 7 - exo-methanol as a colorless liquid having a sweet woody odor with a green leafy side note, e.g., a cedarwood odor, $[\alpha]_D^{27}$ −109° (c., 2.64); $\lambda_{max}$ 2.98 and 13.00$\mu$; $\lambda_{max}$ (0.02 M $CCl_4$) 3640 and 3626 cm.$^{-1}$; n.m.r. spectrum: $\tau$ 4.66 (q., 2, J 5.0, CH—2 and —3), 6.32 (m., 2, —$CH_2$—), 8.88 (s., 3, $CH_3$—), and 9.00 and 9.03 (2s., 6, 2$CH_3$—); m/e: 166, 134, 132, 119, and 108; the 3,5-dinitrobenzoate of this compound was formed as colorless needles from ethanolhexane, M.P. 77–78°.

*Analysis.*—Calculated for $C_{11}H_{18}O$ (percent): C, 79.46; H, 10.92. Found (percent): C, 79.6; H, 10.9.

*Analysis.*—Calculated for $C_{18}H_{20}N_2O_6$ (percent): C, 59.99; H, 5.59; N, 7.77. Found (percent): C, 60.3; H, 5.8; N, 7.9.

In this example, when the (+)-2-carene-4-methanol starting material is replaced with the Formula I starting materials of Figure 1, supra, compounds corresponding to the Formula III products of Figure 1 are formed.

Also in this example, substantially equivalent results are obtained in that 1,4,4-trimethylbicyclo[3.2.0]hept-2-ene-7-methanol is formed when the benzene is replaced by a photosensitizer selected from the following group: aromatic hydrocarbons of from about 6 to about 18 carbon atoms, e.g., toluene or xylene; aromatic amines of from about 6 to about 10 carbon atoms, e.g., aniline or toluidine; aryl ketones of from about 7 to about 13 carbon atoms, e.g., acetophenone or xanthone; and aliphatic ketones of from about 3 to about 12 carbon atoms, e.g., acetone or 2-pentanone.

Also in this example, substantially equivalent results are obtained in that 1,4,4-trimethylbicyclo[3.2.0]hept-2-ene-methanol is formed when the benzene is replaced by a solvent of Example I containing at least 0.5% of one of the photosensitizers disclosed above in this example, e.g., 1:20, 1:1 and 10:1 mixtures by weight of photosensitizer and solvent.

Example III

Nonphotosensitized irradiation of (+)-2-carene-4-methanol at 250 m$\mu$–255 m$\mu$.—A solution of 1.01 g. of (+)-2-carene-4-methanol in 150 ml. of hexane (0.04 M) contained in a quartz flask was irradiated at 250 m$\mu$–255 m$\mu$ with 18 Rayonet RPR-2537A mercury lamps in a Rayonet photochemical reactor (a circular array) for 48 hours. Removal of the solvent at atmospheric pressure gave 1.10 g. of a pale amber oil which was shown by gas chromatography to consist essentially of 1,4,4-trimethylbicyclo[3.2.0]hept - 2 - ene - methanol and recovered starting material.

In this example, when the (+)-2-carene-4-methanol starting material is replaced with the Formula I starting materials of Figure 1, supra, compounds corresponding to the Formula III products of Figure 1 are formed.

Also in this example, substantially equivalent results are obtained in that 1,4,4-trimethylbicyclo[3.2.0]hept-2-ene-methanol is formed when the hexane is replaced by a solvent of Example I.

Example IV

Irradiation of 4-acetyl-2-carene with wavelengths within the range of from 300 m$\mu$ to 350 m$\mu$ to predominately form the photosensitized product, 6-acetyl-1,4,4-trimethylbicyclo[3.2.0]hept-2-ene.—A solution of 1 g. of 4-acetyl-2-carene in 150 ml. of benzene (0.039 M) in a Pyrex container is irradiated at 300 m$\mu$–350 m$\mu$ with a Hanovia type L-679A 450-watt high-pressure mercury lamp for 10 hours. (It is to be noted that benzene does not absorb ultraviolet light above about 280 m$\mu$ and therefore is not a photosensitizer under these irradiation conditions.) Removal of the benzene at atmospheric pressure followed by short-path distillation of the resulting residue gives a colorless liquid containing 7-acetyl-1,4,4-trimethylbicyclo[3.2.0]hept-2-ene.

In this example, when the 4-acetyl-2-carene starting material is replaced by the 4-acyl-2-carene (Formula I) starting materials of Figure 1, supra, compounds corresponding to the 6-acyl-1,8-menthadiene (Formula II) and 7-acyl-1,4,4-trimethylbicyclo[3.2.0]hept-2-ene (Formula III) products of Figure 1 are formed.

Also in this example, substantially equivalent results are obtained in that 7-acetyl-1,4,4-trimethylbicyclo-[3.2.0]hept-2-ene and 6-acetyl-1,8-menthadiene are formed when the cyclohexane is replaced by a solvent of Example I and/or the Pyrex container is replaced by a Corex container.

Example V

Perfume compositions.—Perfume compositions are prepared by intermixing the components shown below:

PERFUME COMPOSITION A

| Component: | Percent by weight |
|---|---|
| 1,4,4 - trimethylbicyclo[3.2.0]hept - 2 - ene - 7-methanol (a Formula III compound) | 5.0 |
| Amyl salicylate | 8.0 |
| Benzoin tincture (1–1) | 5.0 |
| Cedarwood | 12.0 |
| Clove | 3.0 |
| Lavender | 37.0 |
| Musk ambrette | 1.5 |
| Vetivert | 1.5 |
| Terpeneol | 22.0 |
| Geranium Bourbon | 5.0 |

This perfume composition exhibits a highly desirable and useful lavender bouquet odor.

PERFUME COMPOSITION B

| Component: | Percent by weight |
|---|---|
| 1,8-menthadiene-6-methanol (a Formula II compound) | 10.0 |
| Bornyl acetate | 30.0 |
| Cedarleaf | 2.0 |
| Cedarwood | 18.0 |
| Eucalyptus | 10.0 |
| Pine oil | 10.0 |
| Turpentine | 20.0 |

This perfume composition exhibits a highly desirable and useful pine bouquet odor.

As discussed hereinbefore, the compounds prepared by the novel photochemical reaction of this invention are useful in various perfume compositions. Thus, the components and proportions in the perfume compositions of this example can be adjusted according to methods well known in the perfume art to form a wide variety of desirable perfume compositions containing odoriferously effective amounts of Formula II and/or Formula III compounds of this invention, e.g., the compounds of Figure 1.

Example VI

Detergent compositions.—A conventional heavy-duty built detergent having the following composition is prepared:

| Component: | Percent by weight |
|---|---|
| Sodium dodecyl benzene sulfonate | 20.0 |
| Sodium tripolyphosphate | 50.0 |
| Sodium silicate | 6.0 |
| Sodium sulfate | 14.0 |
| Water | 9.8 |
| Perfume composition A of Example V | 0.2 |

This detergent composition exhibits a highly desirable lavender bouquet odor When perfume composition B of Example V is substituted for perfume composition A herein, the detergent composition exhibits a highly desidable pine bouquet odor. Other perfume compositions employing odoriferously effective amounts of Formula II and/or Formula III compounds of this invention, e.g., the compounds of Figure 1, can be substituted for the perfume composition in the detergent composition of this example according to methods well known in the perfume art.

Example VII

Detergent bar compositions.—A conventional household detergent bar having the following composition is prepared:

| Component: | Percent by weight |
| --- | --- |
| Sodium soap | 75.0 |
| Potassium soap | 7.5 |
| (The total soap comprises a mixture of 80% tallow soap and 20% coconut soap.) | |
| Water | 15.0 |
| Perfume composition B of Example V | 2.5 |

This detergent bar exhibits a highly desirable pine bouquet odor. When perfume composition A of Example V is substituted for perfume composition B herein, the detergent bar exhibits a highly desirable lavender bouquet odor. Other perfume compositions employing odoriferously effective amounts of Formula II and/or Formula III compounds of this invention, e.g., the compounds of Figure 1, can be substituted for the perfume composition in the detergent bar of this example according to methods well known in the art.

What is claimed is:

1. A novel photochemical process, which comprises: subjecting a 2-carene compound of the general formula

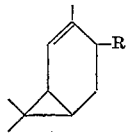

to ultraviolet irradiation of from 200 mμ to 400 mμ to form a compound selected from the group consisting of a 1,8-menthadiene of the general formula

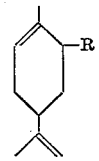

a 1,4,4-trimethylbicyclo[3.2.0]hept-2-ene of the general formula

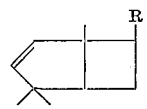

and mixtures thereof, wherein R is the same in each of the above general formulas and is selected from the group consisting of hydrogen, hydroxyl, acyl of from 2 to 5 carbon atoms, alcohol of from 1 to 5 carbon atoms, and alkyl of from 1 to 5 carbon atoms.

2. The photochemical process of claim 1 wherein the irradiation is carried out in the presence of a solvent selected from the group consisting of alcohols, ethers and saturated hydrocarbons.

3. The photochemical process of claim 1 wherein the wavelength of irradiation is distributed throughout the range of from about 200 mμ to about 260 mμ.

4. The photochemical process of claim 1 wherein the irradiation products are separated from the 2-carene starting material.

5. The photochemical process of claim 1 wherein the irradiation is carried out in the presence of a photosensitizer.

6. The photochemical process of claim 5 wherein the photosensitizer is selected from the group consisting of aromatic hydrocarbons, aromatic amines, aryl ketones, and aliphatic ketones.

7. The photochemical process of claim 5 wherein the wavelength of the irradiation is distributed throughout the range of from about 200 mμ to about 360 mμ.

8. The photochemical process of claim 2 wherein irradiation is carried out in the presence of at least 0.5% of a photosensitizer selected from the group consisting of aromatic hydrocarbons, aromatic amines, aryl ketones and aliphatic ketones.

9. The photochemical process of claim 1 wherein the wavelength of the irradiation is substantially exclusively within the range of from about 250 mμ to about 255 mμ.

10. The photochemical process of claim 1 wherein the starting material is a 4-acyl-2-carene and the wavelength of the irradiation is distributed throughout the range of from about 300 mμ to about 350 mμ.

References Cited

UNITED STATES PATENTS 3,380,903  4/1968  Liu et al. _____ 204—162

OTHER REFERENCES

G. Ohloff et al.: Helv. Chim. Acta., 48, 1665—66 (1965).

BENJAMIN R. PADGETT, Primary Examiner

U.S. Cl. X.R.

204—158